United States Patent [19]
Fujimori

[11] Patent Number: 6,135,600
[45] Date of Patent: Oct. 24, 2000

[54] PROJECTOR

[75] Inventor: Motoyuki Fujimori, Suwa, Japan

[73] Assignee: Seiko Epson Corporation, Tokyo, Japan

[21] Appl. No.: 09/201,253

[22] Filed: Nov. 30, 1998

[30] Foreign Application Priority Data

Dec. 1, 1997 [JP] Japan .................................... 9-330620

[51] Int. Cl.⁷ ................................................ G03B 21/14
[52] U.S. Cl. ............................................. 353/119; 353/31
[58] Field of Search ................................ 353/31, 20, 33, 353/34, 37, 81, 119, 122; 349/8, 9, 58

[56] References Cited

U.S. PATENT DOCUMENTS

| | | | |
|---|---|---|---|
| 4,850,685 | 7/1989 | Kamakura et al. | 353/34 |
| 5,092,671 | 3/1992 | Van Os | 353/31 |
| 5,418,586 | 5/1995 | Fujimori et al. | 353/122 |
| 5,455,678 | 10/1995 | Loucks | 356/400 |
| 5,624,174 | 4/1997 | Loucks | 353/122 |
| 5,651,599 | 7/1997 | Fujimori et al. | 353/119 |
| 5,653,522 | 8/1997 | Loucks | 353/122 |
| 5,749,641 | 5/1998 | Brice et al. | 353/81 |
| 5,868,485 | 2/1999 | Fujimori et al. | 353/119 |
| 5,988,818 | 11/1999 | Fujimori et al. | 353/119 |

FOREIGN PATENT DOCUMENTS

| | | |
|---|---|---|
| 57-124982 | 8/1982 | Japan . |
| 60-30424 | 3/1985 | Japan . |
| 60-117215 | 6/1985 | Japan . |
| 60-242424 | 12/1985 | Japan . |
| 61-118707 | 6/1986 | Japan . |
| 62-47288 | 3/1987 | Japan . |
| 62-47289 | 3/1987 | Japan . |
| 63-10128 | 1/1988 | Japan . |
| 63-97080 | 4/1988 | Japan . |
| 63-66816 | 5/1988 | Japan . |
| 63-81481 | 5/1988 | Japan . |
| 6-132590 | 6/1988 | Japan . |
| 63-90383 | 6/1988 | Japan . |
| 63-101985 | 7/1988 | Japan . |
| 63-131290 | 8/1988 | Japan . |
| 64-23185 | 2/1989 | Japan . |
| 64-23186 | 2/1989 | Japan . |
| 64-44693 | 2/1989 | Japan . |
| 1-126869 | 5/1989 | Japan . |
| 1-74688 | 5/1989 | Japan . |
| 1-105280 | 7/1989 | Japan . |
| 1-105281 | 7/1989 | Japan . |
| 1-1139284 | 9/1989 | Japan . |
| 2-10681 | 1/1990 | Japan . |
| 2-140067 | 5/1990 | Japan . |
| 2-162881 | 6/1990 | Japan . |
| 2-85422 | 7/1990 | Japan . |
| 3-202845 | 9/1991 | Japan . |
| 3-259691 | 11/1991 | Japan . |
| 4-86620 | 3/1992 | Japan . |
| 4-194921 | 7/1992 | Japan . |
| 4-101579 | 9/1992 | Japan . |
| 4-45343 | 10/1992 | Japan . |
| 4-340918 | 11/1992 | Japan . |
| 5-53516 | 3/1993 | Japan . |
| 5-33130 | 4/1993 | Japan . |
| 5-80321 | 4/1993 | Japan . |
| 5-323257 | 12/1993 | Japan . |
| 6-118368 | 4/1994 | Japan . |
| 6-202193 | 7/1994 | Japan . |
| 6-347744 | 12/1994 | Japan . |
| 7-063965 | 3/1995 | Japan . |
| 8-184797 | 7/1996 | Japan . |
| WO 95/12142 | 4/1995 | WIPO . |

*Primary Examiner*—William Dowling
*Attorney, Agent, or Firm*—Oliff & Berridge, PLC

[57] ABSTRACT

A projection type display apparatus is provided in which a polarizer is arranged on the light output side of the light valve. A stationary frame plate may be glued and fixed to a light incident surface of a dichroic prism of a projection type display apparatus. A frame plate holding a liquid-crystal light valve may be fastened to the stationary frame plate through an intermediate frame plate using screws. A light output side polarizer may be arranged inside an opening of the stationary frame plate and glued and fixed to the light incident surface of the dichroic prism. This construction may prevent the size of the apparatus from increasing and may restrain temperature rise in the light valve.

26 Claims, 6 Drawing Sheets

PROJECTOR

BACKGROUND OF THE INVENTION

1. Field of Invention

The present invention relates to a projection type display apparatus. More particularly, the present invention relates to a prism structure constituting in a projection type display apparatus.

2. Description of Related Art

In a projection type display apparatus, color beams are modulated by a liquid-crystal light valve (i.e., a light modulation element) and undergo color synthesis using a prism (i.e., a dichroic prism). The liquid-crystal light valve is attached to the light incident surface of the prism. Japanese Patent Application No. 6-118368 discloses an example of the mechanism for mounting this liquid-crystal panel to the prism. The liquid-crystal light valve is directly glued and fixed to the light incident surface of the prism using adhesive.

However, when the light modulation element is directly glued and fixed to the light incident surface of the prism, it is difficult to replace a defective light modulation element. That is, it is not easy to separate the glued and fixed light modulation element without damaging the light incident surface of the prism. Thus, the prism may have to be replaced, which is economically disadvantageous.

SUMMARY OF THE INVENTION

To avoid this problem, a projection type display apparatus is provided that may include a stationary frame plate fastened to the light incident surface of a prism, a light modulation element frame plate for holding a light modulation element, and a fastening device for detachably fastening the light modulation element frame plate to the stationary frame plate. Since the light modulation element frame plate may be detached from the stationary frame plate, a defective light modulation element may be replaced without damaging the prism.

To enhance the contrast of projected images, the type of image display device in which a polarizer (i.e., the light output side polarizer) is glued and fixed to the light output surface of the light modulation element is becoming common. However, in the projection type display apparatus when a polarizer is glued and fixed to the light output surface of the light modulation element, the following problems may occur.

The numerical aperture of the light modulation device may be approximately 50% so that it absorbs part of the incident light and generates heat. The polarizer may absorb part of the light output from the light modulation element depending on its selection characteristic and generates heat. The temperature of the light modulation element may rise as a result of its own heat generation and the heat generation at the polarizer. Optical characteristics of the light modulation element may deteriorate due to the temperature rise. This deterioration in optical characteristics may result in degeneration in the display quality of the projected image. In particular, when illuminance of the light emitted from the light source is enhanced to obtain a brighter projected image, the quantity of light absorbed in the light modulation element increases and the generated heat also increases so that the temperature rise of the light modulation element is conspicuous. When a polarizer having satisfactory selection characteristics is used to improve the contrast of the projected image, the quantity of light absorbed in the polarizer increases and the quantity of heat also increases accordingly so that the temperature rise in the light modulation element is conspicuous.

When gluing the polarizer to the light output surface of the light modulation element, it may be difficult to prevent dust from getting in between the polarizer and the light modulation element. It is additionally not easy to glue the polarizer such that the light output surface of the light modulation element is unflawed. Thus, it is disadvantageous to produce a light modulation element in which the polarizer is glued and fixed to the light output surface of the light modulation element.

Accordingly, the polarizer may be spaced from the light output surface of the light modulation element. However, if the polarizer is spaced from the light output surface then space should be provided for a mechanism that sets the polarizer in an appropriate state. Accordingly, the size of the apparatus increases.

The present invention may provide a projection type display apparatus in which a light modulation element frame plate holding a light modulation element can be detachably fastened to a stationary frame plate that is fastened to a light incident surface of a light synthesizing device. If the polarizer is arranged on the side of the light output surface of the light modulation element, the temperature in the light modulation element may not rise.

A light modulation device frame plate may be provided for holding a light modulation element. The light modulation device may be detachably fastened to a stationary frame plate that is fastened to a light incident surface of a light synthesizing device. If the polarizer is arranged on the side of the light output surface of the light modulation element, then increase in the size of the element does not necessarily occur.

A projection type display apparatus may be provided including a color separation device for separating a beam emitted from a light source into a plurality of color beams, a plurality of light modulation elements for modulating each of the separated color beams, a color synthesizing device for synthesizing the modulated color beams, and a projection device for projecting and enlarging the synthesized light onto a projection surface or screen. The projection type display apparatus may further include a stationary frame plate that is glued and secured to the light incident surface of the color synthesizing device and is equipped with an opening through which light emitted from the light modulation elements transmits therethrough. A light modulation element frame plate for holding the light modulation elements may also be provided. A fastening device may detachably fasten the light modulation element frame plate to the stationary frame plate and a light output side polarizer may be arranged on the side of the light output side of the light modulation elements. The light output side polarizer may be arranged inside the opening of the stationary frame plate.

A space within an opening of a stationary frame plate is utilized to arrange the light output side polarizer so there may not be any need to change the arrangement of the other members for mounting the polarizer or the like, nor is there any increase in size. Since the polarizer is arranged inside the opening of the stationary frame plate, the stationary frame plate may be directly glued and fixed to the light incident surface of the light synthesizing device without interfering with the polarizer. Thus, sufficient adhesion strength can be obtained.

Since the light output side polarizer is spaced apart from the light output surface of the light modulation elements, the heat generated at the light output side of the polarizer will not be directly transmitted to the light modulation elements. Thus, the temperature rise in the light modulation elements may be restrained making it possible to prevent deterioration in the optical characteristics of the light modulation elements. A projected image may be obtained having an excellent display qualities. This is effective when enhancing the illuminance of the output light from the light source and when using a polarizer having excellent selection characteristics.

Since the light output side polarizer is not glued and fixed to the light output surface of the light modulation element, dust does not collect between the polarizer and the light output surface of the light modulation elements and the light output surface of the light modulation elements will not be flawed as compared to when the light output side of the polarizer is glued and fixed to the light output surface of the light modulation elements. Thus, the yield of the light modulation elements may be improved thereby contributing to a reduction in cost.

The light output side of the polarizer may be glued and fixed to the light incident surface of the light synthesizing device to eliminate the need for a special member for holding the light output side of the polarizer. This may realize a simpler construction. Since the color synthesizing device has a larger size than the light modulation elements, heat dissipation of the polarizer may be boosted.

The light modulation elements may be spaced from the light output side of the polarizer so that the light modulation elements can be efficiently cooled using a cooling fan for supplying cooling air between the light modulation elements and the polarizer. Thus, deterioration in the projected image due to temperature rise in the light modulation elements can be prevented.

An intermediate frame plate may be arranged between the stationary frame plate and the light modulation element frame plate. The intermediate frame plate may be detachably fastened to the stationary frame plate by the fastening device and the light modulation element frame plate may be fastened to the intermediate frame plate. A temporary engagement device may temporarily engage the light modulation element frame plate with the intermediate frame plate. For example, an engaging projection may be formed on the intermediate frame plate or the light modulation element frame plate and an engaging pawl may be formed on the other.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
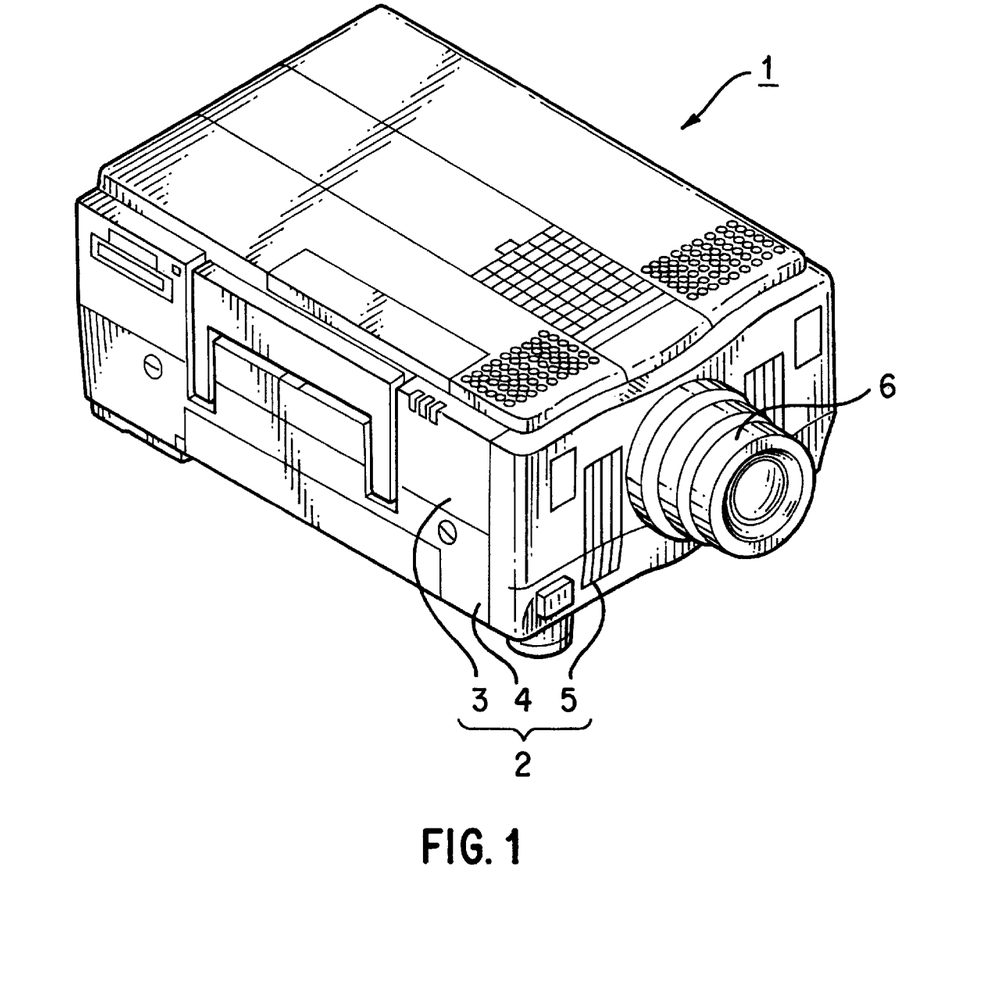
FIG. 1 is an external view of the projection type display apparatus of the present invention.

FIG. 1 shows an external view of the projection type display apparatus 1 of one embodiment of the present invention. The projection type display apparatus 1 has a rectangular parallelepiped outer casing 2. The outer casing 2 may include an upper case 3, a lower case 4 and a front case 5 that forms the front of the apparatus. A projection lens unit 6 projects out of the center of the front case 5.

Figure 2A:
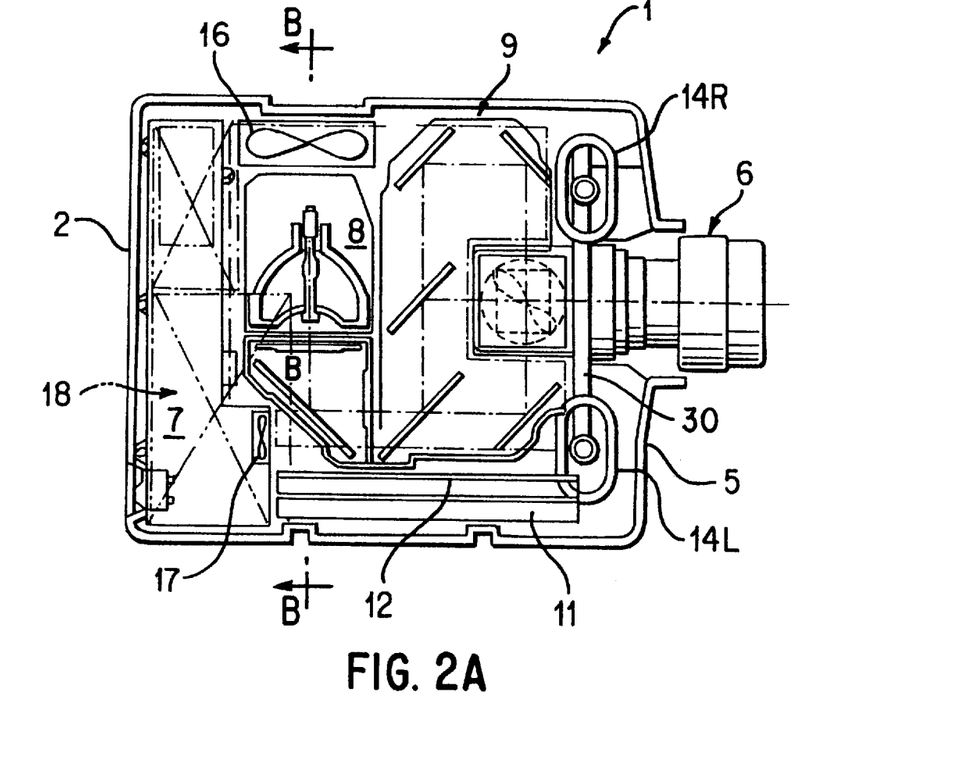
FIG. 2(A) is a general plan view showing the internal structure of the projection-type display apparatus.
Figure 2B:
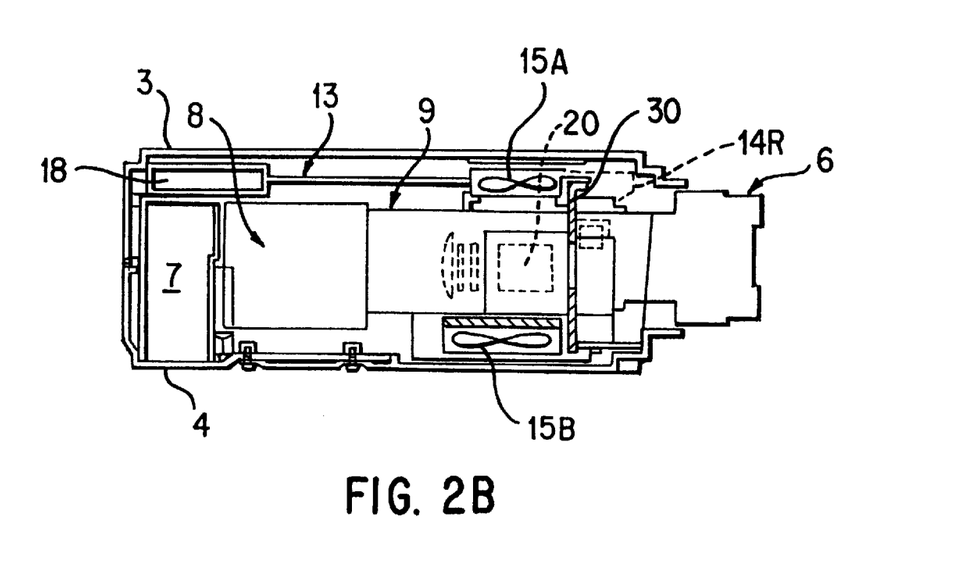
FIG. 2(B) is a sectional view of the apparatus.

FIGS. 2(A)–2(B) show the positional relationship of components inside the outer casing 2 of the projection type display apparatus 1. A power supply unit 7 is arranged at the rear of the outer casing 2. A light source lamp unit 8 and an optical unit 9 are arranged adjacent to the power supply unit 7 and at positions nearer to the front. The base of the projection lens unit 6 is positioned at the front center of the optical unit 9. An interface board (substrate) 11 is arranged on one side of the optical unit 9 having an input/output interface circuit that extends from the front to the back in the casing 2. A video board (substrate) 12 having a video signal processing circuit is mounted thereon and extends parallel with the interface board 11. A control board (substrate) 13 for driving and controlling the apparatus is mounted above the lamp unit 8 and the optical unit 9. Loudspeakers 14R and 14L are arranged on the right-front and left-front corners of the apparatus.

A suction fan 15A for cooling is installed on the top center of the optical unit 9 and a circulating fan 15B for circulating cooling air is attached on the bottom center of the optical unit 9. An exhaust fan 16 may be attached to the rear side of the device which is the back side of the lamp unit 8. Further, an auxiliary cooling fan 17 may be disposed on one side of the power supply unit 7 close to the rear of the boards 11 and 12 for sucking the cooling air from the suction fan 15A into the power supply unit 7.

A floppy disk drive unit 18 may be disposed on the top of the power supply unit 7 on the left-hand side of the apparatus.

Figure 3A:
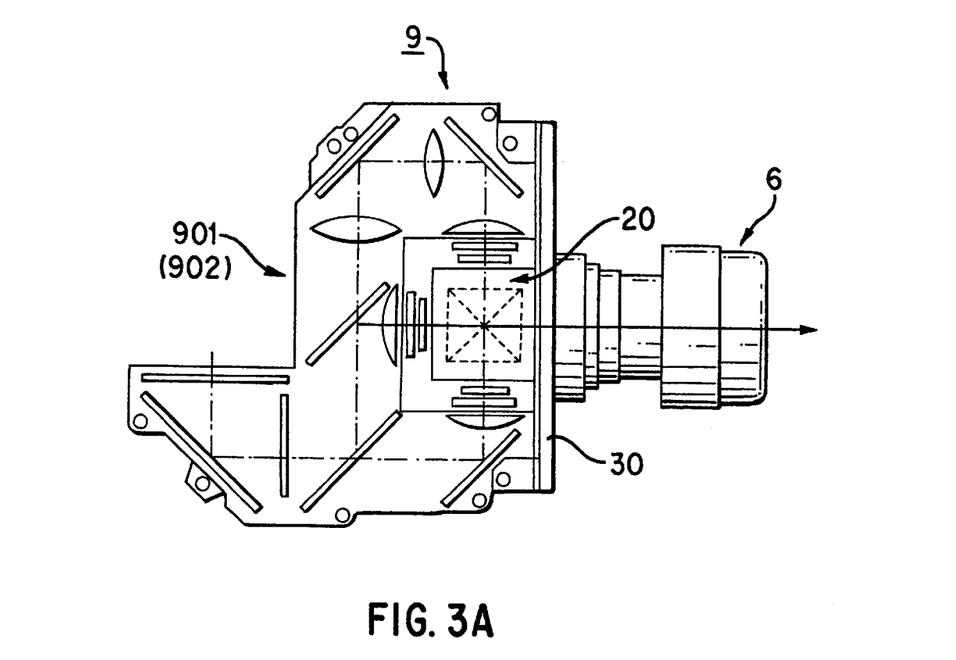
FIG. 3(A) is general plan view showing the optical unit and the projection lens unit.

FIG. 3(A) shows the optical unit 9. In the optical unit 9, the optical elements (other than a prism unit 20 forming a color synthesizing device) are disposed between upper and lower light guides 901 and 902. The upper light guide 901 and the lower light guide 902 are secured to the upper case 3 and the lower case 4, respectively, using fixing screw(s). The upper and lower guides 901 and 902 are also secured to the prism unit 20 using fixing screw(s).

The prism unit 20 is secured to the back side of a diecast head plate 30 using fixing screw(s). The base of the projection lens unit 6 (serving as the projection device) is fastened to the front-side of the head plate 30 using fixing screw(s).

Figure 3B:
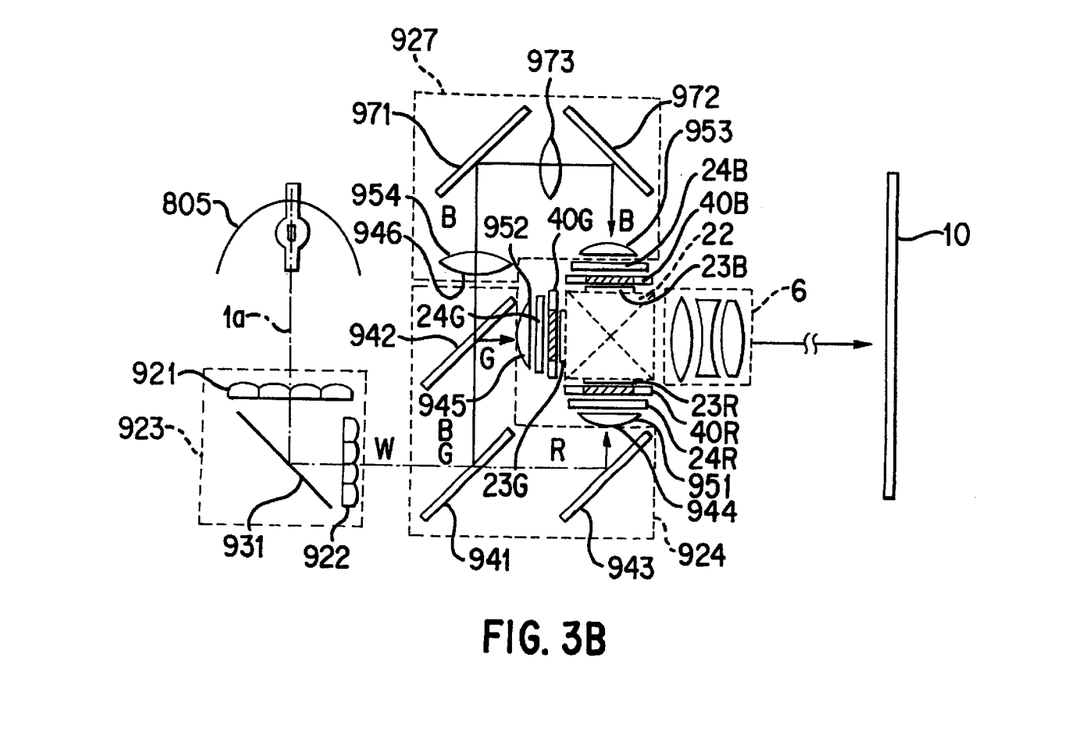
FIG. 3(B) is a general plan view showing the optical system.

FIG. 3(B) shows the optical system incorporated in the projection type display apparatus 1. The optical system may include a light source lamp 805, an illumination optical system 923 composed of integrator lenses 921 and 922 which are uniform illumination optical elements, a color separation optical system 924 for separating a white light beam W output from the illumination optical system 923 into red, green and blue color light beams R, G and B, three liquid-crystal light valves 40R, 40G and 40B for modulating the color light beams, a dichroic prism 22 provided in the prism unit 20 (serving as a color synthesizing device) for re-synthesizing modulated color beams and the projection lens unit 6 for enlarging and projecting the synthesized light beam to the surface of a screen 10. A light guide system 927 guides the blue light beam B separated from the other color light beams by the color separating optical system 924 to the corresponding liquid-crystal light valve 40B.

A halogen lamp, a metal halide lamp, a xenon lamp or the like may be used as the light source lamp 805. The uniform illumination optical system 923 may be provided with a reflecting mirror 931 that reflects light at a right angle to the optical axis 1*a* of the output light from the illumination optical system 923 toward the front of the apparatus. Integrator lenses 921 and 922 may be provided on either side of the mirror 931 in orthogonal relationship to each other.

The color separation optical system 924 may include a blue/green-reflecting dichroic mirror 941, a green-reflecting dichroic mirror 942, and a reflecting mirror 943. The blue light beam B and the green light beam G contained in the white light beam W are first reflected at right angles from the blue/green-reflecting dichroic mirror 941 toward the green-reflecting dichroic mirror 942.

The red light beam R passes through the blue/green-reflecting dichroic mirror 941 and is reflected substantially at a right angle by the reflecting mirror 943 before it is output from the output section 944 for the red light beam R toward the dichroic prism 22. The green light beam G is reflected from the blue/green-reflecting dichroic mirror 941 and is reflected substantially at a right angle by the green-reflecting dichroic mirror 942 and output from the output section 945 for the green light beam G toward the dichroic prism 22. The blue light beam B is reflected from the blue/green-reflecting dichroic mirror 941, is transmitted through the green-reflecting dichroic mirror 942 and is output from the output section 946 for the blue light beam B toward the light guide system 927. In this embodiment, the distances from the output section for the white light beam W of the uniform illumination optical system 923 to the output sections 944, 945 and 946 in the color separation optical system 924 are set equal.

Converging lenses 951, 952 are arranged on the exit sides of the output sections 944 and 945 for the red Tight beam R and the green light beam G, respectively, in the color separating optical system 924. Thus, the red light beam R and the green light beam G output from the output sections 944 and 945 are both collimated by the respective converging lenses 951 and 952.

The collimated red light beam R and the collimated green light beam G are respectively transmitted through the light incident side polarizers 24R and 24G and impinge upon the liquid-crystal light valves 40R and 40G where the light beams are modulated. Image information corresponding to the lights of different colors is imparted to each color light beam. That is, the liquid-crystal light values are switching-controlled by the image information using a driving device (not shown), and the color light beams passing therethrough are thus modulated. Any known device may be used as the driving device. The blue light beam B is guided to the corresponding liquid-crystal light valve 40B through the light guide system 927 to the light incident side polarizer 24B where it is equally modulated according to image information.

The light guide system 927 may include a converging lens 954 arranged on the output side of the output section 946 for the blue beam B, a reflecting mirror 971, a reflecting mirror 972, an intermediate lens 973 arranged between the reflecting mirror 971 and the reflecting mirror 972 and a converging lens 953 arranged prior to the liquid-crystal light valve 40B. The length of the optical path of the blue light beam B is the longest among the lengths of the optical paths of the color light beams (i.e., the distances from the light source lamp 805 to each of the liquid-crystal light valves 40R, 40G and 40B) and thus the blue light beam suffers the most loss. However, by arranging the light guide system 927, the light loss that the blue light beam suffers can be mitigated.

The color light beams modulated by the respective liquid-crystal light valves 40R, 40G and 40B are transmitted through the light output polarizers 23R, 23G and 23B to the dichroic prism 22 where they are re-synthesized. The dichroic prism 22 may be used as the color synthesizing optical system. The color image is resynthesized and is enlarged and projected through the projection lens unit 6 onto a screen 10 located at a predetermined position.

Figure 4:
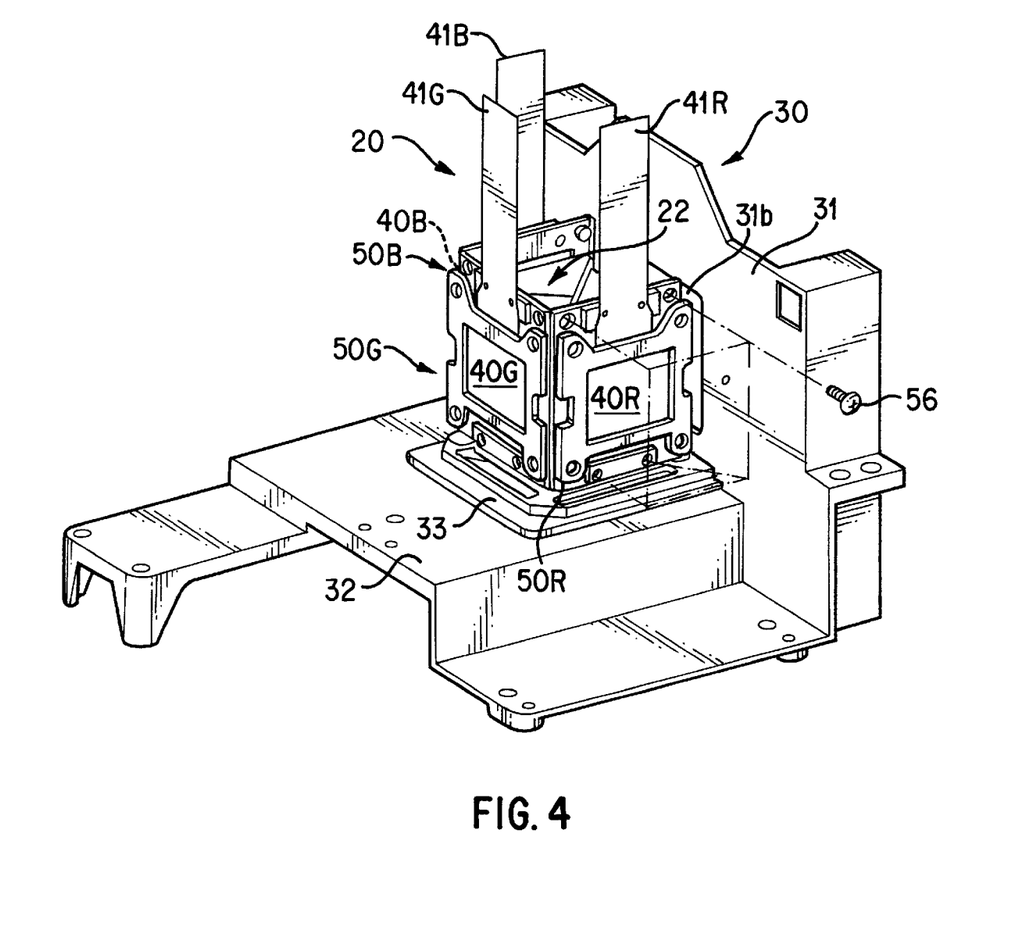
FIG. 4 is a partial perspective view showing the head plate, prism unit and the liquid-crystal light valve unit.
Figure 5:
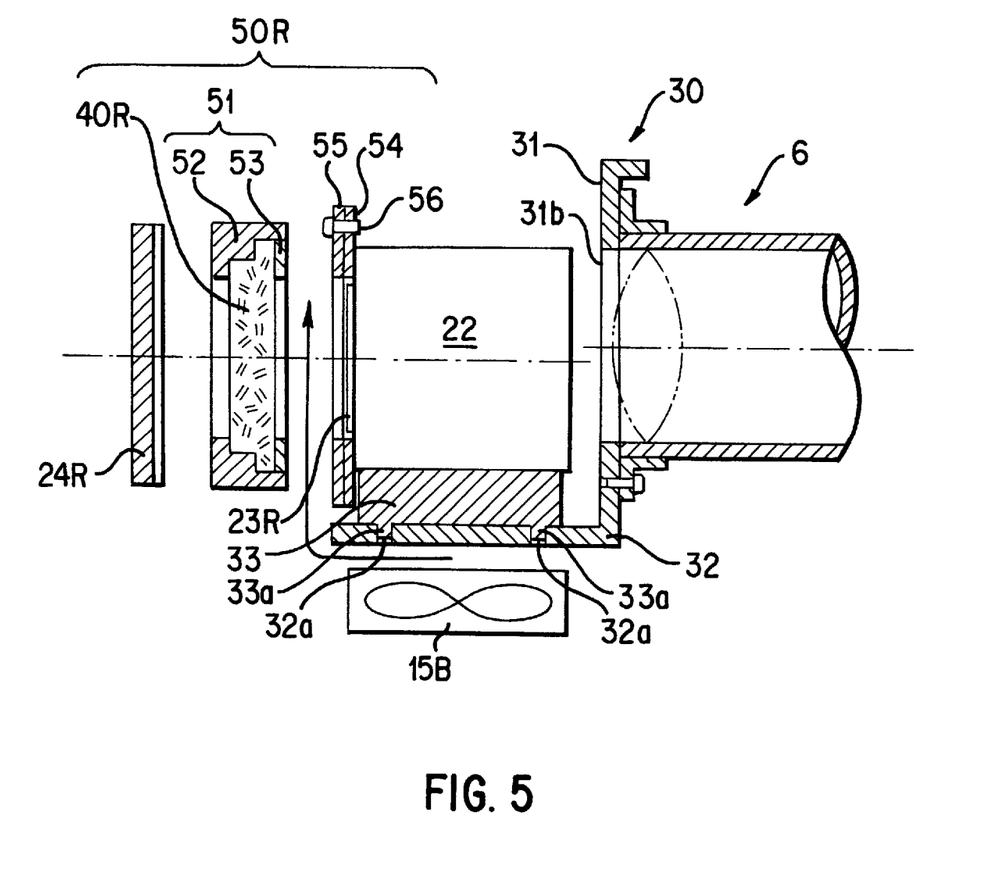
FIG. 5 is a diagram illustrating the relationship between the dichroic prism and the liquid-crystal light valve unit.

FIG. 4 shows the head plate 30 and the prism unit 20 mounted to the head plate 30. FIG. 5 shows peripheral portions of the prism unit 20. The head plate 30 may include a vertical wall 31 extending widthwise and a bottom wall 32 extending horizontally from the lower end of the vertical wall 31. A rectangular opening 31*b* may be formed in the vertical wall 31 through which the light output from the prism unit 20 is transmitted. Reinforcing ribs may be formed on the vertical wall 31 to enhance the rigidity. The prism unit 20 and the projection lens unit 6 are secured in position with the vertical wall 31 placed therebetween to effect the positioning. The prism unit 20 may be secured to the rear of the vertical wall 31 using fixing screw(s). The projection lens unit 6 may be fastened to the front of the vertical wall 31 using fixing screw(s). The components may be firmly formed into an integral unit such that there is little concern that positional deviation will be generated if an impact occurs.

The prism unit 20 may be installed on the top of the bottom wall 32 of the head plate 30. The prism unit 20 may include the rectangular parallelpiped dichroic prism 22 formed by gluing the slant faces of four right-angle prisms 21 having a cross section in the form of a right-angled isosceles triangle, and a prism support plate 33.

The bottom of the dichroic prism 22 is fastened to the surface of the prism support plate 33 by adhesion or the like. Positioning dowels 33*a* may be formed on the bottom of the prism support plate 33. The prism support plate 33 may be fastened into a predetermined position of the bottom wall 32 of the head plate 30 with the dowels 33*a* inserted into slits 32*a* formed in the bottom wall 32 of the head plate 30.

Liquid-crystal light valve units 50R, 50G and 50B having similar constructions are respectively attached to the three side surfaces of the dichroic prism 22. The liquid-crystal light valves 40R, 40G and 40B are held by each of the liquid-crystal light valve units 50R, 50G and 50B, respectively.

Figures 6A, 6B:
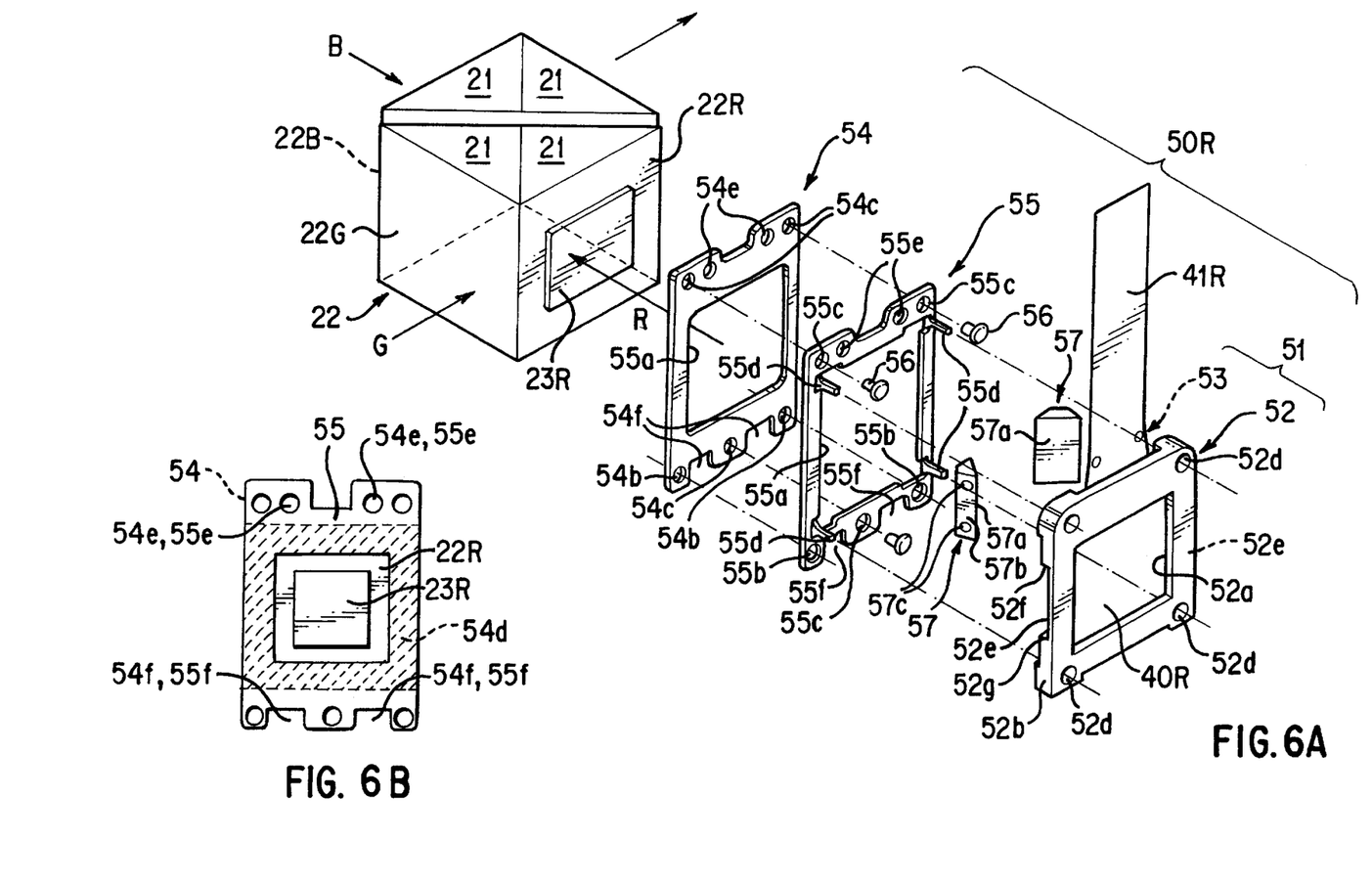
FIG. 6(A) is perspective view showing the liquid-crystal light valve unit.
FIG. 6(B) is a diagram illustrating the relationship between the stationary frame plate and the light outgoing side polarizer.

FIG. 6(A) shows the components of the liquid-crystal light valve unit 50R which holds the liquid-crystal light valve 40R.

As shown in FIGS. 5 and 6(A), the liquid-crystal light valve unit 50R includes a frame plate 51 (i.e., a light modulation element frame plate) that holds the liquid-crystal light valve 40R. The frame plate 51 may include a first frame plate 52 and a second frame plate 53. The liquid-crystal light valve 40R is held between the frame plate 52 and the frame plate 53.

The liquid-crystal light valve unit 50R may further include a stationary frame plate 54 that is glued and fixed to the light incident surface 22R of the dichroic prism 22. The frame plate 51 may be detachably fastened to the stationary frame plate 54 using an intermediate frame plate 55 as shown in FIG. 6(A).

The first frame plate 52 may have an opening 52*a* for allowing light to be transmitted through the liquid-crystal light valve 40R and a peripheral wall 52*b* having a fixed thickness formed around the opening 52*a*. A light transmission opening (not shown) may be formed in the second frame plate 53 for allowing the light output from the liquid-crystal light valve 40R to be transmitted. The size of the second frame plate 53 is such that it can be fitted into the interior of the peripheral wall 52*b* of the first frame plate 52. Thus, the frame plate 51 is formed when the second frame plate 53 is fitted onto the first frame plate 52 with the liquid-crystal light valve 40R held between the first and second frame plates 52 and 53.

An engaging projection and an engaging groove that can be engaged with each other may be formed on the first frame plate 52 and the second frame plate 53 so as to fit the plates together.

The intermediate frame plate 55 may be a rectangular frame having substantially the same size as the first frame plate 52. The intermediate frame plate 55 may have an opening 55*a* for passing the light output from the liquid-crystal light valve 40R. Engaging projections 55*d* perpendicularly extending from the surface of the frame plate are formed in the four corners of the opening 55*a*. Engaging pawls 52*d* are formed in the first frame plate 52 at positions corresponding to each of the engaging projections 55*d* such that the projections 55*d* can be inserted into their corresponding pawls 52*d*. Thus, temporary engagement is achieved when the engaging projections 55*d* of the intermediate frame plate 55 are mated with the engaging pawls 52*d* of the frame plate 51 and they are stacked together.

The stationary frame plate 54 is a rectangular frame substantially the same as the intermediate frame plate 55, and may have an opening 54*a* through which the light output from the liquid-crystal light valve 40R passes. The back of this stationary frame plate 54 is fastened to the light incident surface 22R of the dichroic prism 22 preferably using adhesive. Screw holes 54*c* may be formed at the upper two corners and at a lower central position (with respect to the lateral direction) of the stationary frame plate 54. Screw holes 55*c* may be formed on sides of the intermediate frame plate 55 at positions corresponding to the three screw holes 54*c*. The intermediate frame plate 55 may be fastened to the stationary frame plate 54 by positioning the intermediate frame plate 55 relative to the stationary frame plate 54 such that the corresponding screw holes 54*c* are mated with the screw holes 55*c* and then inserting flat countersunk head screws 56. In this embodiment, the intermediate frame plate 55 may be preferably fastened to the stationary frame plate 54 using three screws 56 although the number of screws may be two or less or four or more. Generally speaking, the less the number of screws, the less the number of screw fastening processes.

Engaging projections 54*b* are formed in the lower right and lower left corners of the stationary frame plate 54. Engaging pawls 55*b* are formed in the lower right and lower left corners of the intermediate frame plate 55. Thus, when fastening with the screws 56, the engaging pawls 55*b* are mated with the engaging projections 54*b* and the intermediate frame plate 55 is pushed toward the stationary frame plate 54 such that the intermediate frame plate 55 can be temporarily engaged with the stationary frame plate 54. This improves the positioning accuracy of the frame plates.

Reference holes 54*e* may be formed at positions adjacent to the screw holes 54*c* formed in the upper portion of the stationary frame plate 54 and reference holes 55*e* may be formed in the upper portion of the intermediate frame plate 55 corresponding to the two reference holes 54*e*. Two reference grooves 54*f* may be formed in the lower portion of the stationary frame plate 54 and reference grooves 55*f* may be formed in the lower portion of the intermediate frame plate 55 corresponding to the two reference holes 54*f*. Thus, after mutually positioning the stationary frame plate 54 and the intermediate frame plate 55 and fixing them using the screws 56, the stationary frame plate 54 may be glued and fixed to a predetermined position of the light incident surface 22R of the dichroic prism 22 using the reference holes 54*e* and 55*e* and the reference grooves 54*f* and 55*f* superimposed one upon the other using a jig.

The liquid-crystal light valve unit 50R may include a positioning device for positioning the frame plate 51 with respect to the intermediate frame plate 55. This positioning device may include two wedges 57. The inclined surfaces 57*a* of the wedges 57 abut against wedge guiding surfaces 52*e* through 52*g*, which are formed at the central position on the right and left side surfaces of the peripheral wall 52*b* of the first frame plate 52. When the frame plate 51 is temporarily engaged with the intermediate frame plate 55, a wedge inserting groove is formed between the wedge guide surface 52*e* of the first frame plate 52 and the frame of the intermediate frame plate 55 opposite thereto. Thus, after temporarily engaging the frame plate 51 with the intermediate frame plate 55, the two wedges 57 are driven in from the right and left of the first frame plate 52. The indentation of the wedges 57 is adjusted to effect positioning of the liquid-crystal light valve 40R.

As shown in FIG. 6(A), two blind holes 57*c* may be provided in the back 57*b* of the wedge 57 and function as engagement sections for chucking when handling the wedge 57 using a jig. The chucking thereof can be easily effected by forming the blind holes 57*c* so that the operation thereof is facilitated.

The light output side polarizer 23R is arranged inside the opening 54*a* of the stationary frame plate 54 and is directly glued and fixed to the light incident surface 22R of the dichroic prism 22. That is, arrangement of the light output side polarizer 23R inside the opening of the stationary frame plate 54 may be done in advance. Arrangement of the other members need not be changed in order to mount the light output side polarizer 23R. Further, there is no increase in size so that the size of the apparatus does not increase. Further, the light output side polarizer 23R is not superimposed on the stationary frame plate 54. That is, as shown in FIG. 6(B), the entire portion 54*d* (i.e., the shaded portion in FIG. 6(B)) of the stationary frame plate 54 is in contact with the light incident surface 22R of the dichroic prism 22 and can be utilized as the adhesion surface. Thus, the stationary frame plate 54 can be glued and fixed to the light incident surface 22R of the dichroic prism 22 without interfering with the light output side polarizer 23R. Thus, a requisite adhesion strength can be sufficiently secured.

In addition, since the light output side polarizer 23R is spaced from the light output surface of the liquid-crystal light valve 40R, the heat generated in the light output side polarizer 23 is not directly transmitted to the liquid-crystal light valve 40R. Further, the heat dissipation of the light output side polarizer 23 is boosted because the light output side polarizer 23 is secured to the dichroic prism 22 having a larger heat capacity than that of the liquid-crystal light valve 40R. Further, as indicated by the arrow in FIG. 5, cooling air from the cooling fan 15B arranged below the dichroic prism 22 may be guided between the liquid-crystal light valve 40R and the light output side polarizer 23R. Thus, the liquid-crystal light valve 40R may be cooled and the temperature rise may be restrained. Thus, optical characteristics of the liquid-crystal light valve 40R may be prevented from deteriorating thereby making it possible to obtain a projected image having excellent display quality. This is effective when a bright projected image is to be obtained by enhancing the illuminance of the output light from the light source or when a projected image having an excellent contrast is to be obtained by enhancing the selection characteristic of the light output side polarizer 23R.

Dust will generally not exist between the light output side polarizer 23R and the light output surface of the liquid-crystal light valve 40R. Further, the light output surface of the liquid-crystal light valve 40R will generally not be flawed as compared to when the light output side polarizer 23 is glued and fixed to the liquid-crystal light valve 40R. Thus, improvements in the yield of the liquid-crystal light valve unit 50R may be achieved, which is advantageous in reducing the cost.

Procedures for mounting the liquid-crystal light valve unit 5OR to the light incident surface 22R of the dichroic prism 22 will now be described. First, the dichroic prism 22 is glued and fixed to prism support plate 33. Then, the light output side polarizer 23R is glued and fixed to the light incident surface 22R of the dichroic prism 22. Positioning of the polarizer 23R with respect to the light incident surface 22R is preferably performed using a jig. An ultraviolet curing type adhesive can be used as the adhesive although other types of adhesive may be used.

The stationary frame plate 54 and the intermediate frame plate 55 are then fixed to each other. Positioning of the intermediate frame plate 55 may be performed with respect to the surface of the stationary frame plate 54 and the intermediate frame plate 55 may be fixed using three flat countersunk head screws 56.

The stationary frame plate 54 (having the intermediate frame plate 55 fixed thereto) is positioned and then glued and fixed to the light incident surface 22R of the dichroic prism 22 (having the light output side polarizer 23) preferably using a jig. The reference holes 54e and 55e and the reference grooves 54f and 55f formed in the stationary frame plate 54 and the intermediate frame plate 55 are utilized as positioning sections for the jig. When the stationary frame plate 54 is glued and fixed to the light incident surface 22R of the dichroic prism 22, then the light output side polarizer 23R is arranged to be within the opening 54a of the stationary frame plate 54.

The prism support plate 33 may be fixed to the bottom wall 32 of the head plate 30 such that the dowels 33a formed on the prism support plate 33 are inserted into the slits 32a of the head plate 30. The prism support plate 33 may be fixed at a predetermined position of the bottom wall 32 of the head plate 30.

The frame plate 51 holding the liquid-crystal light valve 40R may then be prepared, and positioned with respect to the intermediate frame plate 55 and temporarily engaged therewith. That is, the engaging projections 55d of the intermediate frame plate 55 may be mated with the engaging pawls 52d of the frame plate 51, and the frame plate 51 may be pushed toward the intermediate frame plate 55. Before gluing and fixing the stationary frame plate 54 to the dichroic prism 22, the stationary frame plate 54 and the intermediate frame plate 55 may be formed into an integral unit using the flat countersunk screws 56 to thereby make positional accuracy easier.

Positioning of the liquid-crystal light valve 40R with respect to the light incident surface 22R of the dichroic prism 22 may be achieved using wedges 57 as the positioning device although other types of positioning devices are also within the scope of this invention. That is, the two wedges 57 may be inserted into the gap between the frame plate 51 and the intermediate frame plate 55 along the wedge guide surfaces 52e formed on the first frame plate 52 to temporarily engage the frame plate 51 and the intermediate frame plate 55. Alignment adjustment and focus adjustment of the liquid-crystal light valve 40R may be effected by adjusting indentation of the wedges 57.

When positioning has been effected, the wedges 57 are glued and fixed to the frame plate 51 and the intermediate frame plate 55 preferably using adhesive such as an ultraviolet curing type adhesive.

The liquid-crystal light valve units 5OG and 50B holding the liquid-crystal light valves 40G and 40B have the same construction as described above so a description thereof will be omitted.

The positioning of the wedges 57 and the gluing and fixing of the wedges 57 will now be described in more detail.

First, the focusing surface of the liquid-crystal light valve 40G in the focusing surface of the projection lens unit 6 may be adjusted using a dedicated adjusting device. To effect temporary engagement, ultraviolet curing type adhesive may be injected into the gap formed by inserting the engaging projections 55d of the intermediate frame plate 55 into the engaging pawls 52d of the frame plate 51 and set by ultraviolet irradiation. Ultraviolet rays may be applied to the ultraviolet curing type adhesive formed on the exposed surfaces of the wedges 57 to thereby effect the final fixing. The liquid-crystal light valve 40G may be arranged at the center of the liquid-crystal light valves 40R and 40B and used as a reference to similarly effect focus adjustment and mutual pixel matching adjustment of the liquid-crystal light valves 40R and 40B, which effects temporary engagement and final fixing.

FIG. 4 shows the liquid-crystal light valves 40R, 40G and 40B attached to the three light incident surfaces 22R, 22B and 22G of the dichroic prism 22. In FIG. 4, the members upwardly extending from each of the liquid-crystal light valve units 50R, 50 and 50G are flexible cables for wiring 41R, 41G and 41B.

Accordingly, the present invention provides a projection type display apparatus including a stationary frame plate fastened to a light incident surface of a color synthesizing device, a light modulation element frame plate holding light modulation elements, a fastening device for detachably fastening the light modulation element frame plate to the stationary frame plate, and a light output side polarizer arranged on the light output side of the light modulation elements. The light output side polarizer may be arranged inside an opening of the stationary frame plate. Thus, a special space need not be prepared for arranging the light output side polarizer or changing the arrangement of the other members. This avoids an increase in the size of the apparatus. Further, the stationary frame plate may be directly glued and fixed to the light incident surface of the color synthesizing device without interfering with the light output side polarizer so that the adhesion strength for the stationary frame plate is satisfactory.

Since the heat generated in the light output side polarizer is not directly transmitted to the light modulation elements, temperature rise in the light modulation elements can be restrained, thereby preventing optical characteristics of the light modulation elements from deteriorating. Accordingly, a projected image having an excellent display quality may be obtained. This is effective when enhancing the illuminance of the light output from the light source or when using a polarizer having excellent selection characteristics.

Further, since the light output side polarizer is not glued or fixed to the light incident surface of the light modulation elements, there is little concern that dust will exist between the polarizer and the light incident surface of the light modulation elements or that the light incident surface of the light modulation elements will be flawed as when the light output side polarizer is glued and fixed to the light incident surface of the light modulation elements. Thus, improvement in the yield of the light modulation elements may be achieved, which is advantageous in achieving a reduction in cost.

While the invention has been described in relation to preferred embodiments, many modifications and variations are intended to be within the scope of the present invention as defined in the appended claims.

What is claimed is:

1. A projector comprising:
   a color separation device that separates a beam emitted from a light source into a plurality of color beams;
   a plurality of light modulators each receiving one of the color beams and modulating the received color beam;
   a color synthesizing prism that receives and synthesizes the modulated color beams;
   a projection lens that receives the synthesized color beams and projects the color beams;
   a stationary frame plate attached to a light incident surface of the color synthesizing prism and having an opening through which light is transmitted;
   a light modulator frame plate that supports one of the light modulators;
   a fastener that fastens the light modulator frame plate to the stationary frame plate; and
   a light output side polarizer arranged between one of the light modulators and the color synthesizing prism, the light output side polarizer positioned within the opening of the stationary frame plate.

2. The projector of claim 1, wherein the light output side polarizer is attached to a light incident surface of the color synthesizing prism.

3. The projector of claim 1, further comprising a cooling fan that provides cooling airflow between one of the light modulators and the light output side polarizer.

4. The projector of claim 1, further comprising an intermediate frame plate provided between the stationary frame plate and the light modulator frame plate, the intermediate frame plate being detachably fastened to the stationary frame plate by the fastener, the light modulator frame plate being fastened to the intermediate frame plate.

5. The projector of claim 4, further comprising an engagement device that engages the light modulator frame plate with the intermediate frame plate.

6. The projector of claim 5, wherein the engagement device includes an engaging projection formed on one of the intermediate frame plate and the light modulator frame plate and an engaging pawl formed on the other one of the intermediate frame plate and the light modulator frame plate.

7. A projector comprising:
   a light input device that provides a plurality of color light beams;
   a plurality of light modulators each for modulating one of the color light beams;
   a dichroic prism that receives each of the color beams modulated by the light modulators;
   a stationary frame plate provided on an input side of the dichroic prism and having an opening allowing light to pass;
   a light modulator frame plate that supports one of the light modulators; and
   a polarizer attached to the dichroic prism and being provided within the opening of the stationary frame plate.

8. The projector of claim 7, further comprising a fastener that fastens the light modulator frame plate with the stationary frame plate.

9. The projector of claim 7, wherein the dichroic prism synthesizes the color beams, the apparatus further comprising a projection lens that receives the synthesized color beams and projects and enlarges the synthesized color beams.

10. The projector of claim 7, wherein the stationary frame plate is attached to the dichroic prism.

11. The projector of claim 7, further comprising a cooling device that provides cooling air between one of the light modulators and the polarizer.

12. The projector of claim 7, further comprising an intermediate frame plate provided between the stationary frame plate and the light modulator frame plate.

13. The projector of claim 12, further comprising an engagement device that engages the light modulator frame plate with the intermediate frame plate.

14. The projector of claim 13, wherein the engagement device includes at least an engagement projection and an engagement pawl.

15. A projector comprising:
   a light input device that provides three color light beams, the light input device including a first, second and third light modulator each being provided in an optical path of one of the color light beams;
   a dichroic prism that receives the modulated light beams output from the light input device, the dichroic prism synthesizing the received light beams;
   a first light modulator frame plate that supports the first light modulator;
   a first stationary frame plate provided between the first light modulator frame plate and the dichroic prism, the first stationary frame plate having an opening allowing light to pass; and
   a first polarizer provided between the first light modulator frame plate and the dichroic prism and being provided within the opening of the first stationary frame plate.

16. The projector of claim 15, further comprising:
   a second light modulator frame plate that supports the second light modulator;
   a second stationary frame plate provided between the second light modulator frame plate and the dichroic prism, the second stationary frame plate having an opening allowing light to pass; and
   a second polarizer provided between the second light modulator frame plate and the dichroic prism and being provided within the opening of the second stationary frame plate.

17. The projector of claim 15, wherein the first polarizer is attached to the dichroic prism.

18. The projector of claim 15, wherein the first stationary frame plate is attached to the dichroic prism.

19. The projector of claim 15, further comprising a first intermediate frame plate provided between the first stationary frame plate and the first light modulator frame plate.

20. The projector of claim 16, wherein the second polarizer is attached to the dichroic prism.

21. The projector of claim 16, wherein the second stationary frame plate is attached to the dichroic prism.

22. The projector of claim 16, further comprising a second intermediate frame plate provided between the second stationary frame plate and the second light modulator frame plate.

23. The projector of claim 16, further comprising:

a third light modulator frame plate that supports the third light modulator;

a third stationary frame plate provided between the third light modulator frame plate and the dichroic prism, the third stationary frame plate having an opening allowing light to pass; and a third polarizer provided between the third light modulator frame plate and the dichroic prism and being provided within the opening of the third stationary frame plate.

24. The projector of claim 23, wherein the third polarizer is attached to the dichroic prism.

25. The projector of claim 23, wherein the third stationary frame plate is attached to the dichroic prism.

26. The projector of claim 23, further comprising a third intermediate frame plate provided between the third stationary frame plate and the third light modulator frame plate.

* * * * *